(12) United States Patent
Chiarotto et al.

(10) Patent No.: US 11,707,921 B2
(45) Date of Patent: Jul. 25, 2023

(54) ITEM HAVING IMPROVED THERMOMECHANICAL PROPERTIES, COMPRISING AN ORGANIC-INORGANIC LAYER

(71) Applicant: ESSILOR INTERNATIONAL, Charenton-le-Pont (FR)

(72) Inventors: Sébastien Chiarotto, Charenton-le-Pont (FR); Karin Scherer, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 102 days.

(21) Appl. No.: 16/923,439

(22) Filed: Jul. 8, 2020

(65) Prior Publication Data

US 2021/0023826 A1   Jan. 28, 2021

Related U.S. Application Data

(63) Continuation of application No. 15/750,428, filed as application No. PCT/FR2016/052042 on Aug. 5, 2016, now abandoned.

(30) Foreign Application Priority Data

Aug. 5, 2015 (FR) .................... 1557560

(51) Int. Cl.
| | | |
|---|---|---|
| *B32B 27/08* | (2006.01) | |
| *C09D 183/04* | (2006.01) | |
| *B32B 27/28* | (2006.01) | |
| *C07F 7/08* | (2006.01) | |

(52) U.S. Cl.
CPC ............ *B32B 27/08* (2013.01); *B32B 27/283* (2013.01); *B32B 2307/40* (2013.01); *B32B 2383/00* (2013.01); *C07F 7/0838* (2013.01); *C09D 183/04* (2013.01); *Y10T 428/26* (2015.01); *Y10T 428/265* (2015.01); *Y10T 428/31663* (2015.04)

(58) Field of Classification Search
CPC ............. C03C 17/34; C03C 17/3405; C03C 2217/734; C03C 2218/151; C03C 2218/154; C07F 7/0838; G02B 1/111; G02B 5/287; B32B 27/08; B32B 2307/40; B32B 2383/00; B32B 27/283; Y10T 428/31663; Y10T 428/26; Y10T 428/265; C09D 183/04

See application file for complete search history.

(56) References Cited

U.S. PATENT DOCUMENTS

| | | |
|---|---|---|
| 5,508,368 A | 4/1996 | Knapp et al. |
| 5,888,593 A | 3/1999 | Petrmichl et al. |
| 2003/0072895 A1* | 4/2003 | Sakakura ............... G02B 1/115 |
| | | 428/1.3 |
| 2003/0198818 A1 | 10/2003 | Mitsuishi et al. |
| 2004/0146723 A1 | 7/2004 | Mitsuishi et al. |
| 2008/0002260 A1 | 1/2008 | Arrouy et al. |
| 2014/0354945 A1 | 12/2014 | Martinu et al. |
| 2015/0103310 A1 | 4/2015 | De Ayguavives et al. |

FOREIGN PATENT DOCUMENTS

| | | |
|---|---|---|
| EP | 1306695 | 5/2003 |
| EP | 1324078 | 7/2003 |
| WO | WO 1999/049097 | 9/1999 |
| WO | WO 2008/001011 | 1/2008 |
| WO | WO 2008/015364 | 2/2008 |
| WO | WO 2008/062142 | 5/2008 |
| WO | WO 2009/004222 | 1/2009 |
| WO | WO 2009/047426 | 4/2009 |
| WO | WO 2010/109154 | 9/2010 |
| WO | WO 2011/080472 | 7/2011 |
| WO | WO 2013/098531 | 7/2013 |
| WO | WO 2013/171434 | 12/2013 |
| WO | WO 2014/199103 | 12/2014 |

OTHER PUBLICATIONS

Analysis of SiO2 Thin Films Deposited by PECVD Using an Oxygen-TEOS Argon Mixture NPL document (Year: 2000).
International Search Report issued in International Application No. PCT/FR2016/052042, dated Nov. 4, 2016.

\* cited by examiner

*Primary Examiner* — Michael B Nelson
(74) *Attorney, Agent, or Firm* — Norton Rose Fulbright US LLP

(57) ABSTRACT

The invention relates to an item comprising a substrate having at least one main surface coated with a multilayer interferential coating comprising at least one layer with a refractive index higher than 1.65 and at least one layer with a refractive index lower than, or equal to, 1.65, at least one of the layers of the interferential coating being an organic-inorganic layer that has been deposited in a vacuum environment and has a thickness of at least 30 nm, said interferential coating having a thickness of at least 450 nm and/or at least 8 layers.

19 Claims, No Drawings

ITEM HAVING IMPROVED THERMOMECHANICAL PROPERTIES, COMPRISING AN ORGANIC-INORGANIC LAYER

CROSS-REFERENCE TO RELATED APPLICATIONS

This application is a continuation of co-pending U.S. application Ser. No. 15/750,428 filed 5 Feb. 2018, which is a national phase application under 35 U.S.C. § 371 of International Application No. PCT/FR2016/052042 filed 5 Aug. 2016, which claims priority to French Patent Application No. 1557560 filed 5 Aug. 2015. The entire contents of each the above-referenced disclosures is specifically incorporated by reference herein without disclaimer.

BACKGROUND OF THE INVENTION

1. Field of the Invention

The present invention generally relates to an article, preferably an optical article, especially an ophthalmic lens, possessing an interference coating including at least one layer of organic-inorganic nature, preferably an antireflection coating or an optical filter, the thermomechanical properties of which have been improved.

2. Description of Related Art

It is known to coat optical articles such as ophthalmic lenses or screens with interference coatings, in particular antireflection coatings, that are generally formed from a multilayer stack of dielectric mineral materials such as SiO, $SiO_2$, $Si_3N_4$, $TiO_2$, $ZrO_2$, $Al_2O_3$, $MgF_2$ or $Ta_2O_5$.

One of the problems encountered with any type of mineral interference coating, this type of coating generally being deposited by vacuum evaporation or by sputtering, is their high fragility from a mechanical point of view mainly due to their mineral nature. These coatings are strained to a greater or lesser extent and may find it difficult to undergo a deformation or a substantial dilation, because the stress experienced often results in a problem with adherence and/or cracking that propagates over all of the area of the coating, generally making it unusable, this problem getting worse as the thickness of the layers increases.

Thus, during the trimming and fitting of an eyeglass at an opticians, the eyeglass undergoes mechanical deformations that may produce cracks in interference coatings, in particular when the operation is not carried out with care. Similarly, thermal stresses (heating of the frame) can produce cracks in the interference coating. Depending on the number and the size of the cracks, the latter can interfere with the field of view of the wearer and prevent the eyeglass from being sold. Furthermore, while the treated organic eyeglasses are being worn, scratches can appear. In mineral interference coatings, some scratches lead to cracking, making the scratches more visible because of scattering of light.

The fragility of an interference coating from a mechanical point of view increases with its thickness and/or as the number of layers therein increases, a large interference-coating thickness possibly resulting from the use of thick layers or of many layers.

However, the conception of effective optical filters generally requires stacks possessing these characteristics. These thick and/or complex structures generally lead to a poor abrasive and thermomechanical performance due to the nature of the deposited inorganic layers, which are fragile from a thermomechanical point of view.

The application WO 2013/098531, on behalf of the applicant, describes an article having improved thermomechanical performances, comprising a substrate having at least one main surface coated with a multilayer interference coating, said coating comprising a layer A not formed from inorganic precursor compounds having a refractive index of less than or equal to 1.55, which constitutes:

either the external layer of the interference coating, or an intermediate layer, directly in contact with the external layer of the interference coating, this external layer of the interference coating being in this second case an additional layer having a refractive index of less than or equal to 1.55, said layer A having been obtained by deposition, under an ion beam, of activated species resulting from at least one precursor compound C in the gaseous form of silico-organic nature, such as octamethylcyclotetrasiloxane (OMCTS).

Patent application WO 2014/199103, in the name of the applicant, describes a multilayer interference coating obtained in a similar technology, the external layer of which is a layer A obtained by deposition, under ion beam, of activated species issued from at least one precursor compound in gaseous form of organosilicon nature such as 2,4,6,8-tetramethylcyclotetrasiloxane (TMCTS).

The two latter patent applications however do not address the production of interference coatings that are thick and/or that possess many layers.

SUMMARY OF THE INVENTION

One aim of the invention is to provide an effective means for satisfactorily decreasing the inherent fragility of mineral interference coatings that are thick (that possess thick layers for example) and/or that possess many layers and for significantly increasing the temperature or the stress beyond which dilation or deformation of the coating causes cracking therein, in particular with a view to producing complex stacks such as those required by optical filters.

The invention is targeted in particular at articles possessing an improved critical temperature, that is to say exhibiting a good resistance to cracking when they are subjected to an increase in temperature. Another objective of the invention is to provide a process for manufacturing an article equipped with an interference coating that is simple, easy to carry out and reproducible.

These problems are solved according to the invention by modifying the nature of one or more inorganic layers of the interference coating, which one or more layers are replaced by one or more layers of organic-inorganic nature, i.e. layers based on compounds containing carbon and a metal or metalloid. According to the invention, these materials are used instead of conventional inorganic materials such as titanium dioxide, zirconium or silica in interference coatings that are thick and/or that possess many layers.

The set aims are therefore achieved according to the invention with an article comprising a substrate having at least one main surface coated with a multilayer interference coating comprising at least one layer having a refractive index higher than 1.65 and at least one layer having a refractive index lower than or equal to 1.65, at least one of the layers of the interference coating being a layer of organic-inorganic nature that was deposited under vacuum and that has a thickness larger than or equal to 30 nm, said interference coating having a thickness larger than or equal to 450 nm and/or a number of layers higher than or equal to 8.

In the present patent application, when an article comprises one or more coatings at its surface, the expression "to deposit a layer or a coating on the article" means that a layer or a coating is deposited on the uncovered (exposed) surface of the external coating of the article, that is to say its coating furthest from the substrate.

A coating which is "on" a substrate or which has been deposited "on" a substrate is defined as a coating which (i) is positioned above the substrate, (ii) is not necessarily in contact with the substrate (although it preferably is in contact), that is to say one or more intermediate coatings can be positioned between the substrate and the coating in question, and (iii) does not necessarily completely cover the substrate (although it preferably covers it). When "a layer 1 is located under a layer 2", it will be understood that the layer 2 is further from the substrate than the layer 1.

The article produced according to the invention comprises a substrate, preferably a transparent substrate, having front and back main faces, at least one of said main faces and preferably both main faces comprising an interference coating comprising at least one organic-inorganic layer. An organic-inorganic layer is defined as being a layer comprising atoms of carbon, a metal or metalloid and preferably oxygen. It is according to the invention obtained by vacuum deposition.

The "back face" of the substrate (the back face generally being concave) is understood to mean the face which, when the article is being used, is closest to the eye of the wearer. Conversely, the "front face" of the substrate (the front face generally being convex) is understood to mean the face which, when the article is being used, is furthest from the eye of the wearer.

Although the article according to the invention can be any article, such as a screen, a glazing unit, a pair of protective glasses which can be used in particular in a working environment, a mirror or an article used in electronics, it preferably is an optical article, in particular an optical article usable in the ophthalmic field or in the field of precision optics, for example an optical filter, an optical lens, an ophthalmic lens (whether corrective or not) for a pair of spectacles, or an optical or ophthalmic lens blank, such as a semi-finished optical lens, in particular a spectacle eyeglass. The lens can be a polarized or tinted lens or a photochromic or electrochromic lens.

The substrate of the article according to the invention is preferably an organic glass, for example made of thermoplastic or thermosetting plastic. This substrate can be chosen from the substrates mentioned in the application WO 2008/062142, for example a substrate obtained by (co)polymerization of diethylene glycol bis(allyl carbonate), a substrate made of poly(thio)urethane, a substrate based on polyepisulfide or a substrate made of (thermoplastic) bisphenol A polycarbonate, denoted PC, or a substrate made of PMMA (polymethyl methacrylate).

The interference coating according to the invention may be formed on at least one of the main faces of a bare substrate, i.e. an uncoated substrate, or on at least one of the main faces of a substrate already coated with one or more functional coatings.

Before the interference coating is deposited on the substrate, which is optionally coated, for example with an anti-abrasion and/or anti-scratch coating, it is common to subject the surface of said optionally coated substrate to a physical or chemical activation treatment intended to increase the adhesion of this coating. This pre-treatment is generally carried out under vacuum. It may be a bombardment with energetic and/or reactive species, for example an ion beam (ion pre-cleaning or IPC) or an electron beam, a corona discharge treatment, a glow discharge treatment, a UV treatment or a vacuum plasma treatment. It may also be a matter of an acidic or basic surface treatment and/or a surface treatment with solvents (water or organic solvent). These treatments are described in greater detail in application WO 2014/199103.

The article according to the invention includes an interference coating comprising at least one organic-inorganic layer, which forms either a low-refractive-index layer of the in particular antireflection, multilayer interference coating, or a high-refractive-index layer.

In the present application, a layer, in particular a layer of the interference coating, is said to be a high-refractive-index layer when its refractive index is higher than 1.65, preferably higher than or equal to 1.70, better still higher than or equal to 1.8 and even better still higher than or equal to 2.0, and a layer is said to be a low-refractive-index layer when its refractive index is lower than or equal to 1.65, preferably lower than or equal to 1.55, better still lower than or equal to 1.50, and even better still lower than or equal to 1.45.

The interference coating may be any interference coating conventionally used in the field of optics, in particular of ophthalmic optics, except for the fact that it includes at least one layer having a refractive index higher than 1.65 and at least one layer having a refractive index lower than or equal to 1.65, that at least one of its layers is an organic-inorganic layer that was deposited under vacuum, and that it meets the aforementioned conditions with respect to thickness and/or number of layers.

The interference coating may be, non-limitingly, an optical filter, an antireflection coating, a reflective (mirror) coating, preferably a selective optical filter and/or an antireflection coating, in particular an infrared filter, an ultraviolet filter (preferably an anti-UV antireflection coating), but also preferably a selective optical filter including a filtering zone in the domain of the blue (400-500 nm). Such a filter at least partially blocks blue light, which is harmful to the eyes of the wearer.

An antireflective coating is defined as a coating, deposited at the surface of an article, which improves the antireflective properties of the final article. It makes it possible to reduce the reflection of light at the article-air interface over a relatively broad portion of the visible spectrum.

As is well known, interference coatings, preferably antireflection coatings, conventionally comprise a stack of dielectric materials forming high-refractive-index (HI) layers and low-refractive-index (LI) layers.

The HI layers are conventional layers of high refractive index, well known in the art. They generally comprise one or more mineral oxides, such as, without limitation, zirconia ($ZrO_2$), titanium dioxide ($TiO_2$), tantalum pentoxide ($Ta_2O_5$), neodymium oxide ($Nd_2O_5$), hafnium oxide ($HfO_2$), praseodymium oxide ($Pr_2O_3$), praseodymium titanate ($PrTiO_3$), $La_2O_3$, $Nb_2O_5$, $Y_2O_3$, indium oxide $In_2O_3$ or tin oxide $SnO_2$. Preferred materials are $TiO_2$, $Ta_2O_5$, $PrTiO_3$, $ZrO_2$, $SnO_2$, $In_2O_3$ and their mixtures.

The LI layers are also well-known layers and can comprise, without limitation, $SiO_2$, $MgF_2$, $ZrF_4$, alumina ($Al_2O_3$) in a small proportion, $AlF_3$ and their mixtures, preferably $SiO_2$. Use may also be made of SiOF (fluorine-doped $SiO_2$) layers. Ideally, the interference coating of the invention does not comprise any layer comprising a mixture of silica and alumina.

The total thickness of the interference coating is generally larger than 100 nm and preferably larger than one of the following values: 450 nm, 500 nm, 600 nm, 700 nm, 800 nm, 900 nm, 1 micron, 1.1 microns, 1.2 microns.

The total thickness of the interference coating is preferably smaller than or equal to 2 microns and even better still smaller than or equal to 1.5 μm. In one embodiment, the total thickness of the interference coating is smaller than or equal to 450 nm. In this case, the interference coating necessarily has a number of layers higher than or equal to 8.

The process of the invention is particularly advantageous for the deposition of multilayer interference coatings that are thick or that possess thick layers or a high number of layers. Specifically, interference stacks of this type are naturally more fragile from a mechanical point of view. The fact that a multilayer interference coating that is thick or that possesses thick layers or a high number of layers includes at least one organic-inorganic layer according to the invention allows it to achieve superior elastic and thermomechanical properties, and in particular improved deformation properties.

Preferably again, the interference coating, which is preferably an antireflective coating, comprises at least two low-refractive-index (LI) layers and at least two high-refractive-index (HI) layers. The total number of layers in the interference coating is preferably higher than or equal to 8, better still higher than or equal to 9, and even better still higher than or equal to 10. In certain embodiments, the total number of layers in the interference coating is lower than 8, or even lower than or equal to 6, but in this case, the interference coating necessarily has a thickness larger than or equal to 450 nm.

Preferably, the interference coating simultaneously has a thickness larger than or equal to 450 nm, 500 nm, 600 nm, 700 nm, 800 nm, 900 nm, 1 micron, 1.1 microns or 1.2 microns and a number of layers higher than or equal to 8, 9 or 10.

It is not necessary for the HI and LI layers to alternate in the interference coating, although they can be alternating according to one embodiment of the invention. Two (or more) HI layers can be deposited on one another, just as two (or more) LI layers can be deposited on one another.

The organic-inorganic layer of the interference coating preferably comprises atoms of carbon, of oxygen, and of a metal or metalloid chosen from silicon, zirconium, titanium and niobium, preferably silicon. In the latter case, it is a silico-organic layer. It is preferably obtained by depositing at least one organosilicon compound, under vacuum. The deposition of the organic-inorganic layer is preferably assisted by a source of ions. The assistance with a source of ions is preferably an ion bombardment, generally carried out with an ion gun. A layer formed from an organosilicon compound is a layer of organic-inorganic nature insofar as the deposition process is such that the deposited layer comprises atoms of carbon, of oxygen, and of a metal or metalloid.

In the present patent application, oxides of metalloids are considered as being metal oxides, and the generic term "metal" also designates metalloids.

According to one embodiment, all the low-refractive-index layers of the interference coating are identical or different organic-inorganic layers. In another embodiment, the external layer of the multilayer interference coating, that is to say the layer of the interference coating furthest from the substrate in the order of stacking, is a low-refractive-index organic-inorganic layer. A low-refractive-index organic-inorganic layer (having a refractive index lower than or equal to 1.65), denoted layer A, is preferably deposited directly on a high-refractive-index layer.

Preferably, the external layer of the interference coating is a low-refractive-index layer that is preferably located directly in contact with a subjacent high-refractive-index layer. According to another embodiment, all the high-refractive-index layers of the interference coating are identical or different organic-inorganic layers. In certain articles according to the invention, the first layer of the interference coating, in the order of deposition, is a high-refractive-index organic-inorganic layer. A high-refractive-index organic-inorganic layer according to the invention (having a refractive index higher than 1.65) is denoted layer B.

According to one preferred embodiment, all the layers of the interference coating are organic-inorganic layers. In this case, the interference coating may be composed of an alternation of layers A and B according to the invention making direct contact with one another.

According to another embodiment, all the layers of the interference coating comprise at least one organosilicon compound that may be chosen from the organosilicon compounds described below.

According to the preferred embodiment of the invention, the organic-inorganic layer is a low-refractive-index layer (having a refractive index lower than or equal to 1.65 and preferably lower than or equal to 1.55), denoted layer A, which is preferably obtained by vacuum deposition and in particular by evaporation or co-evaporation, of, depending on the circumstances, one or two categories of precursors in gaseous form: at least one organosilicon compound A and optionally at least one inorganic compound, which is preferably a metal oxide. The following description will generally make reference to the metal oxide precursor of the layer A but will also be applicable to the case where the inorganic precursor compound is not a metal oxide. This deposition is preferably assisted by a source of ions (in particular a beam of ions) and ideally under ion bombardment. This technique of deposition under a beam of ions makes it possible to obtain activated species resulting from at least one organosilicon compound A and from at least one metal oxide (when it is present), in gaseous form.

The optional inorganic precursor compound of the layer A is preferably a low-refractive-index metal oxide, which expression was defined above. It may be chosen from metal oxides and mixtures thereof suitable for the low-refractive-index layers as described above, or from substoichiometric metal oxides such as a substoichiometric silicon oxide, of formula $SiO_x$, with $x < 2$, x preferably varying from 0.2 to 1.2. It is preferably a question of the oxides $SiO_2$ or $SiO$ or of mixtures thereof, ideally $SiO_2$.

The refractive index of the layer A is lower than or equal to 1.65 and preferably lower than or equal to 1.50. According to embodiments of the invention the refractive index of the layer A is higher than or equal to 1.45, more preferably higher than 1.47, even more preferably higher than or equal to 1.48 and ideally higher than or equal to 1.49.

When a high-refractive-index inorganic layer (that preferably contains at least one metal oxide having a refractive index higher than or equal to 1.8) must be deposited on a layer A, it is preferable to insert between these two layers a layer denoted layer C comprising a silicon oxide and having a thickness smaller than or equal to 15 nm, in order to obtain a better adhesion at the interface. The silicon oxide of this layer may be chosen from silicon ($SiO_2$) and substoichiometric silicon oxides, of formula $SiO_x$, with $x < 2$, x preferably varying from 0.2 to 1.2. It is preferably a question of the oxides $SiO_2$ or $SiO$ or of mixtures thereof, ideally $SiO_2$.

The layer C, deposited on the layer A and in direct contact therewith, preferably contains at least 50 wt % silicon oxides (for example silica), with respect to the total weight of the layer C, more preferably 75 wt % or more, even more preferably 90 wt % or more and ideally 95 wt % or more. According to one preferred embodiment, the layer C is a layer formed exclusively from silicon oxides. The layer C, when it is present, is a thin layer having a thickness preferably smaller than or equal to 10 nm, which preferably varies from 2 to 10 nm, and better still from 5 to 10 nm. Preferably, the amount of organic compounds or organosilicon compounds in the layer C is smaller than 10% by weight with respect to the weight of the layer C, better still smaller than 5% and even better still smaller than 1%.

According to one embodiment of the invention, the interference coating comprises an underlayer. It is in this case generally the first layer of this interference coating in the order of deposition of the layers, i.e. the layer of the interference coating that makes contact with the bare or coated substrate.

"Underlayer of the interference coating" is understood to mean a coating of relatively great thickness used with the aim of improving the resistance to abrasion and/or to scratches of said coating and/or to promote its adhesion to the substrate. The underlayer according to the invention can be chosen from the underlayers described in the application WO 2010/109154. The underlayer may also be a layer of organic-inorganic nature or comprise a layer of organic-inorganic nature. In this case, said layer of organic-inorganic nature comprised in or forming the underlayer is preferably a layer A.

Preferably, the underlayer has a thickness of 100 to 500 nm. It is preferably exclusively mineral/inorganic in nature and preferably consists of silica $SiO_2$.

In one embodiment, the organic-inorganic layer is a high-refractive-index layer, denoted layer B, which is preferably obtained by vacuum deposition of at least one high-refractive-index metal oxide and of at least one organosilicon compound B. This deposition is preferably assisted by a source of ions.

The precursor metal oxide of the layer B is a high-refractive-index metal oxide, which expression was defined above. It may be chosen from metal oxides and mixtures thereof suitable for the high-refractive-index layers as described above, or from substoichiometric metal oxides such as a substoichiometric titanium or zirconium oxide, of respective formulae $TiO_x$ and $ZrO_x$, with x <2, x preferably varying from 0.2 to 1.2.

It is preferably a question of the oxide $TiO_2$ or of a substoichiometric titanium oxide such as the compounds TiO, $Ti_2O_3$, or $Ti_3O_5$, or indeed of a hafnium oxide.

The use of titanium oxide is advantageous due to the high refractive index of this metal oxide. The refractive index of $TiO_2$ in the rutile form is effectively of the order of 2.65 at 550 nm. Thus, the layer B can retain a high refractive index 1.8), even if the titanium oxide is mixed with an organosilicon compound B of lower refractive index.

Preferably, the refractive index of the layer B is higher than or equal to at least one of the following values: 1.7, 1.8, 1.9, 2.0, 2.05 and ideally higher than or equal to 2.1.

The layer B of the final article preferably contains at least one metal oxide having a refractive index higher than or equal to 1.8. This metal oxide may be the same as the precursor metal oxide used to form the layer B and described above or be different therefrom, insofar as the deposition process of the layer B may induce a modification of the precursor metal oxide such as an oxidation. It is preferably a question of a titanium oxide, in particular the compound $TiO_2$.

The layer B is formed from a material obtained by vacuum deposition, preferably under assistance by a source of ions (in particular an ion beam) and preferably under ion bombardment, in particular by co-evaporation, of two categories of precursors in gaseous form: at least one metal oxide and at least one organosilicon compound B. This technique of deposition under a beam of ions makes it possible to obtain activated species resulting from at least one organosilicon compound B and from at least one metal oxide, in the gaseous form.

The article of the invention can be rendered antistatic by virtue of the incorporation, preferably into the interference coating, of at least one electrically conductive layer. The nature and the location in the stack of the electrically conductive layer which can be used in the invention are described in more detail in the application WO 2013/098531. It is preferably a layer with a thickness of 1 to 20 nm preferably comprising at least one metal oxide chosen from indium tin oxide ($In_2O_3$:Sn, indium oxide doped with tin, denoted ITO), indium oxide ($In_2O_3$) and tin oxide ($SnO_2$).

The various layers of the interference coating other than those described above are preferably deposited by vacuum deposition using one of the following techniques: i) evaporation, optionally ion-assisted evaporation, ii) ion-beam sputtering, iii) cathode sputtering or iv) plasma-enhanced chemical vapor deposition. These various techniques are described in the works "Thin Film Processes" and "Thin Film Processes II", edited by Vossen and Kern, Academic Press, 1978 and 1991, respectively. A particularly recommended technique is the vacuum evaporation technique. Preferably, the deposition of the organic-inorganic layers is carried out in a vacuum chamber comprising an ion gun directed toward the substrates to be coated, which emits, toward said substrates, a beam of positive ions generated in a plasma within the ion gun. Preferably, the ions resulting from the ion gun are particles consisting of gas atoms from which one or more electron(s) have been stripped and which are formed from a rare gas, oxygen or a mixture of two or more of these gases.

As the organic-inorganic layers are formed by vacuum deposition, they do not comprise organosilicon-compound hydrolysate and thus differ from sol-gel coatings obtained by wet processing.

Precursors, namely the silico-organic compound B and the metal oxide (in the case of the layer B) or the silico-organic compound A and the optional inorganic compounds (in the case of the layer A), are introduced or pass in a gaseous state into the vacuum chamber. They are preferably conveyed in the direction of the ion beam and are activated and disassociated under the effect of the ion gun.

Without wishing to be restricted by any one theory, the inventors believe that, in the case of the layer B, the ion gun induces an activation/dissociation of the precursor compound B and of the precursor metal oxide, thereby it is believed allowing an organic-inorganic layer containing M—O—Si—$CH_x$, bonds, M representing the metal atom of the metal oxide, to be formed, a similar process taking place in the case of the layer A when the latter is formed from a metal oxide. In the absence of metal oxide, the disassociation of the precursor compounds, in particular the silico-organic compounds, creates free radicals that deposit on the substrate.

This deposition technique using an ion gun and a gaseous precursor, sometimes denoted by "ion beam deposition", is described in particular, with only organic precursors, in patent U.S. Pat. No. 5,508,368. It allows layers with low mechanical strains to be formed.

According to the invention, preferably, the only place in the chamber where a plasma is generated is the ion gun.

The ions can, if appropriate, be neutralized before they exit the ion gun. In this case, the bombardment will still be regarded as being ion bombardment. The ion bombardment causes an atomic rearrangement in and a densification of the layer being deposited, which makes it possible to tamp it down while it is in the course of being formed and has the advantage of increasing its refractive index because of its densification.

During the implementation of the process according to the invention, the surface to be treated is preferably bombarded by ions with a current density generally of between 20 and 1000 $\mu A/cm^2$, preferably between 30 and 500 $\mu A/cm^2$ and better still between 30 and 200 $\mu A/cm^2$, over the activated surface, and generally under a residual pressure in the vacuum chamber which can range from $6\times10^{-5}$ mbar to $2\times10^{-4}$ mbar and preferably from $8\times10^{-5}$ mbar to $2\times10^{-4}$ mbar. An argon and/or oxygen ion beam is preferably used. When a mixture of argon and oxygen is employed, the $Ar/O_2$ molar ratio is preferably ≤1, better still ≤0.75 and even better still ≤0.5. This ratio can be controlled by adjusting the gas flow rates in the ion gun. The argon flow rate generally varies from 0 to 30 sccm. Preferably, no rare gases are used. The oxygen $O_2$ flow rate preferably varies from 5 to 30 sccm, and rises in proportion as the flow rate of the precursor compounds of the layers A and B increases.

The ions of the ion beam, preferentially resulting from an ion gun, used during the deposition of the layer A and/or B preferably have an energy ranging from 5 to 1000 eV, better still from 5 to 500 eV, preferentially from 75 to 150 eV, preferentially even from 80 to 140 eV and better still from 90 to 110 eV. The activated species formed are typically radicals or ions.

In the event of ion bombardment during the deposition, it is possible to carry out a plasma treatment concomitant or nonconcomitant with the deposition under an ion beam of the layers A and/or B. These layers are preferably deposited without the assistance of a plasma at the level of the substrates.

The deposition of the layers A and/or B, which may be carried out using identical or different methods, is done in the presence of an oxygen source when the precursor compound in question (A and/or B) does not contain (or does not contain enough) oxygen atoms and when it is desired for the corresponding layer to contain a certain proportion of oxygen. Likewise, the layers A and/or B are deposited in the presence of a nitrogen source when the precursor compound in question (A and/or B) does not contain (or does not contain enough) nitrogen atoms and when it is desired for the corresponding layer to contain a certain proportion of nitrogen. Generally, it is preferable to introduce oxygen gas with, if appropriate, a low content of nitrogen gas, preferably in the absence of nitrogen gas.

Besides the organic-inorganic layers, other layers of the interference coating can be deposited under ion bombardment as described above, that is to say by using bombardment by means of an ion beam of the layer being formed, which ions are preferably emitted by an ion gun.

The preferred method for the vaporization of the precursor materials of the organic-inorganic layers, carried out under vacuum, is physical vapor deposition, in particular vacuum evaporation, generally combined with a heating of the compounds to be evaporated. It may be implemented by using evaporation systems as diverse as a Joule-effect heat source (the Joule effect is the thermal manifestation of the electrical resistance) or an electron gun. For liquid or solid precursors, any other device known to those skilled in the art may also be used.

The organosilicon precursor compounds A and B are preferably introduced into the vacuum chamber in which articles according to the invention are produced in gaseous form, while controlling its flow rate. This means that they are preferably not vaporized in the interior of the vacuum chamber (contrary to the precursor metal oxides).

Preferably, the employed metal oxides are preheated so as to reach a molten state then evaporated. They are preferably deposited by vacuum evaporation using an electron gun in order to bring about their vaporization.

In the case of the layer B, the precursor compound B and the precursor metal oxide are preferably deposited concomitantly (for example by coevaporation) or partially concomitantly, that is to say with overlapping of the stages of deposition of both precursors. In the latter case, the deposition of one of the two precursors begins before the deposition of the other, the deposition of the second precursor beginning before the end of the deposition of the first precursor. The same goes for the layer A when the latter is formed from an inorganic compound.

The organosilicon compounds A and B, respective precursors of the layers A and B, are of organic nature and independent of each other. They may therefore be identical or different, and contain in their structure at least one silicon atom and at least one carbon atom. They preferably include at least one Si—C bond and preferably include at least one hydrogen atom. According to one embodiment, the compound A and/or B comprises at least one nitrogen atom and/or at least one oxygen atom, preferably at least one oxygen atom.

The concentration of each chemical element in the layers A and B (metal M, Si, O, C, H, N, and the like) can be determined using the RBS (Rutherford Backscattering Spectrometry) technique or ERDA (Elastic Recoil Detection Analysis).

The atomic percentage of metal atoms in the layer B preferably varies from 10 to 30%. The atomic percentage of carbon atoms in the layer B preferably varies from 10 to 20%. The atomic percentage of hydrogen atoms in the layer B preferably varies from 10 to 30%. The atomic percentage of silicon atoms in the layer B preferably varies from 10 to 20%. The atomic percentage of oxygen atoms in the layer B preferably varies from 20 to 40%.

The atomic percentage of metal atoms in the layer A preferably varies from 0 to 15%. The atomic percentage of carbon atoms in the layer A preferably ranges from 10 to 25% and more preferably from 15 to 25%. The atomic percentage of hydrogen atoms in the layer A preferably ranges from 10 to 40% and more preferably from 10 to 20%. The atomic percentage of silicon atoms in the layer A preferably ranges from 5 to 30% and more preferably from 15 to 25%. The atomic percentage of oxygen atoms in the layer A preferably ranges from 20 to 60% and more preferably from 35 to 45%.

The following compounds are nonlimiting examples of cyclic or noncyclic organic compounds A and/or B: octamethylcyclotetrasiloxane (OMCTS), decamethyl cyclopentasiloxane, dodecamethylcyclohexasiloxane, hexamethylcyclotrisiloxane, hexamethyldisiloxane (HMDSO), octamethyltrisiloxane, decamethyltetrasiloxane, dodecamethylpentasiloxane, tetraethoxysilane, vinyltrimethylsilane, hexamethyldisilazane, hexamethyldisilane, hexamethylcyclotrisilazane, vinylmethyldiethoxysilane, divinyltetramethyldisiloxane, tetramethyldisiloxane, polydimethylsiloxane (PDMS), polyphenylmethylsiloxane (PPMS) or a tetraalkylsilane, such as tetramethylsilane.

Preferably, the organosilicon compound A and/or B comprises at least one silicon atom carrying at least one alkyl group, preferably a $C_1$-$C_4$ alkyl group, better still at least one silicon atom carrying one or two identical or different alkyl groups, preferably $C_1$-$C_4$ alkyl groups, for example the methyl group.

The preferred precursor compounds A and/or B comprise an Si—O—Si group, better still a divalent group of formula (3):

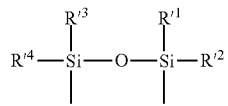

where $R'^1$ to $R'^4$ independently denote linear or branched alkyl or vinyl groups, preferably $C_1$-$C_4$ alkyl groups, for example the methyl group, monocyclic or polycyclic aryl groups, the hydroxyl group or hydrolysable groups. Non-limiting examples of hydrolysable groups are the following groups: H, halogen (chloro, bromo, iodo, and the like), alkoxy, aryloxy, acyloxy, —$NR^1R^2$, where $R^1$ and $R^2$ independently denote a hydrogen atom, an alkyl group or an aryl group, and —$N(R^3)$—Si, where $R^3$ denotes a hydrogen atom, a linear or branched alkyl group, preferably a $C_1$-$C_4$ alkyl group, or a monocyclic or polycyclic aryl group, preferably a monocyclic aryl group. Groups comprising an Si—O—Si chain member are not regarded as being "hydrolysable groups" within the meaning of the invention. The preferred hydrolysable group is the hydrogen atom.

According to another embodiment, the precursor compound A and/or B corresponds to the formula:

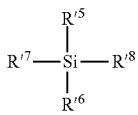

in which $R'^5$, $R'^6$, $R'^7$ and $R'^8$ independently denote hydroxyl groups or hydrolysable groups, such as OR groups, in which R is an alkyl group.

According to a first embodiment, the compound A and/or B comprises at least one silicon atom carrying two identical or different alkyl groups, preferably $C_1$-$C_4$ alkyl groups. According to this first embodiment, the compound A and/or B is preferably a compound of formula (3) in which $R'^1$ to $R'^4$ independently denote alkyl groups, preferably $C_1$-$C_4$ alkyl groups, for example the methyl group.

Preferably, the silicon atom or atoms of the compound A and/or of the compound B when it is present do not comprise any hydrolysable group or hydroxyl group in this embodiment.

The one or more silicon atoms of the precursor compound A and/or B of the layer A and/or B are preferably solely bonded to alkyl groups and/or groups comprising an —O—Si or —NH—Si chain member, so as to form an Si—O—Si or Si—NH—Si group. The preferred precursor compounds of the layer A and/or B are OMCTS, HMDSO and decamethyltetrasiloxane.

It preferably concerns a cyclic polysiloxane of formula (4):

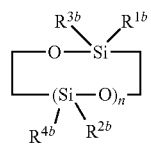

where n designates an integer ranging from 2 to 20, preferably from 3 to 8, and $R^{1b}$ to $R^{4b}$ independently represent linear or branched alkyl groups, preferably $C_1$-$C_4$ alkyl groups (for example the methyl group), vinyl, aryl or a hydrolysable group. The preferred members belonging to this group are octaalkylcyclotetrasiloxanes (n=3), preferably octamethylcyclotetrasiloxane (OMCTS). In some cases, the layer A and/or B results from a mixture of a certain number of compounds of formula (4), where n can vary within the limits indicated above.

According to a second embodiment, the compound A and/or B comprises, in its structure, at least one Si—X' group, where X' is a hydroxyl group or a hydrolysable group, which can be chosen, without limitation, from the following groups: H, halogen, alkoxy, aryloxy, acyloxy, —$NR^1R^2$, where $R^1$ and $R^2$ independently denote a hydrogen atom, an alkyl group or an aryl group, and —$N(R^3)$—Si, where $R^3$ denotes a hydrogen atom, an alkyl group or an aryl group.

According to this second embodiment of the invention, the compound A and/or B preferably comprises, in its structure, at least one Si—H group, that is to say constitutes a silicon hydride. Preferably, the silicon atom of the Si—X' group is not bonded to more than two non-hydrolysable groups, such as alkyl or aryl groups.

Among the X' groups, the acyloxy groups preferably have the formula —O—$C(O)R^4$, where $R^4$ is an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the aryloxy and alkoxy groups have the formula —O—$R^5$, where $R^5$ is an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the halogens are preferably F, Cl, Br or I, the X' groups of formula —$NR^1R^2$ can denote an amino $NH_2$, alkylamino, arylamino, dialkylamino or diarylamino group, $R^1$ and $R^2$ independently denoting a hydrogen atom, an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups, the X' groups of formula —$N(R^3)$—Si are attached to the silicon atom via their nitrogen atom and their silicon atom naturally comprises three other substituents, where $R^3$ denotes a hydrogen atom, an aryl group, preferably a $C_6$-$C_{12}$ aryl group, optionally substituted by one or more functional groups, or an alkyl group, preferably a linear or branched $C_1$-$C_6$ alkyl group, optionally substituted by one or more functional groups and additionally being able to comprise one or more double bonds, such as the phenyl, methyl or ethyl groups.

The preferred acyloxy group is the acetoxy group. The preferred aryloxy group is the phenoxy group. The preferred halogen group is the Cl group. The preferred alkoxy groups are the methoxy and ethoxy groups.

In the second embodiment, the compound A and/or B preferably comprises at least one silicon atom carrying at least one linear or branched alkyl group, preferably $C_1$-$C_4$ alkyl group, better still at least one silicon atom carrying one or two identical or different alkyl groups, preferably $C_1$-$C_4$ alkyl groups, and an X' group (preferably a hydrogen atom) directly bonded to the silicon atom, X' having the meaning indicated above. The preferred alkyl group is the methyl group. The vinyl group can also be used instead of an alkyl group. Preferably, the silicon atom of the Si—X' group is directly bonded to at least one carbon atom.

Preferably, each silicon atom of the compound A and/or B is not directly bonded to more than two X' groups, better still is not directly bonded to more than one X' group (preferably a hydrogen atom) and better still each silicon atom of the compound A and/or B is directly bonded to a single X' group (preferably a hydrogen atom). Preferably, the compound A and/or B comprises an Si/O atomic ratio equal to 1. Preferably the compound A and/or B comprises a C/Si atomic ratio <2, preferably ≤1.8, better still ≤1.6 and even better still ≤1.5, ≤1.3 and optimally equal to 1. Preferably again, the compound A and/or B comprises a C/O atomic ratio equal to 1. According to one embodiment, the compound A and/or B does not comprise an Si—N group and better still does not comprise a nitrogen atom.

The one or more silicon atoms of the precursor compound A and/or B are preferably solely bonded to alkyl or hydrogen groups and/or groups comprising an —O—Si or —NH—Si chain member, so as to form an Si—O—Si or Si—NH—Si group. In one embodiment, the compound A and/or B comprises at least one Si—O—Si—X' group or at least one Si—NH—Si—X' group, X' having the meaning indicated above and preferably representing a hydrogen atom.

According to this second embodiment, the compound A and/or B is preferably a compound of formula (3) in which at least one of $R'^1$ to $R'^4$ denotes an X' group (preferably a hydrogen atom), X' having the meaning indicated above.

According to this second embodiment, the compound A and/or B is preferably a cyclic polysiloxane of formula (5):

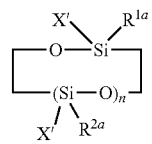

where X' has the meaning indicated above and preferably represents a hydrogen atom, n designates an integer ranging from 2 to 20, preferably from 3 to 8, and $R^{1a}$ and $R^{2a}$ independently represent an alkyl group, preferably a $C_1$-$C_4$ alkyl group (for example the methyl group), vinyl, aryl or a hydrolysable group. Nonlimiting examples of hydrolysable X' groups are the chloro, bromo, alkoxy, acyloxy, aryloxy and H groups. The commonest members belonging to this group are the tetra-, penta- and hexaalkylcyclotetrasiloxanes, preferably the tetra-, penta- and hexamethylcyclo-tetrasiloxanes, 2,4,6,8-tetramethylcyclotetrasiloxane (TMCTS) being the preferred compound. In some cases, the layer A and/or B results from a mixture of a certain number of compounds having the above formula, where n can vary within the limits indicated above.

According to another embodiment, the compound A and/or B is a linear alkylhydrosiloxane, better still a linear methylhydrosiloxane, such as, for example, 1,1,1,3,5,7,7,7-octamethyltetrasiloxane, 1,1,1,3,5,5,5-heptamethyltrisiloxane or 1,1,3,3,5,5-hexamethyltrisiloxane.

The following compounds are nonlimiting examples of cyclic or non-cyclic organic precursor compounds A and/or B in accordance with the second embodiment: 2,4,6,8-tetramethylcyclotetrasiloxane (TMCTS of formula (1)), 2,4,6,8-tetraethylcyclotetrasiloxane, 2,4,6,8-tetraphenylcyclotetrasiloxane, 2,4,6,8-tetraoctylcyclotetrasiloxane, 2,2,4,6,6,8-hexamethylcyclotetrasiloxane, 2,4,6-trimethylcyclotrisiloxane, cyclotetrasiloxane, 1,3,5,7,9-pentamethylcyclopentasiloxane, 2,4,6,8,10-hexamethylcyclohexasiloxane, 1,1,1,3,5,7,7,7-octamethyltetrasiloxane, 1,1,3,3,5,5-hexamethyltrisiloxane, tetramethyldisiloxane, tetraethoxysilane, vinylmethyldiethoxysilane, a hexamethylcyclotrisilazane, such as 3,4,5,6-hexamethylcyclotrisilazane or 2,2,4,4,6,6-hexamethylcyclotrisilazane, 1,1,1,3,5,5,5-heptamethyltrisiloxane, tris (trimethylsiloxy)silane (of formula (2)), 1,1,3,3-tetramethyldisilazane, 1,2,3,4,5,6,7,8-octamethylcyclotetrasilazane, nonamethyltrisilazane, tris (dimethylsilyl)amine or hexamethyldisilazane.

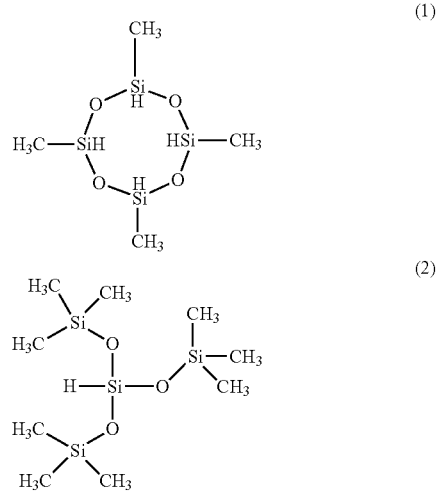

The use of at least one organosilicon compound B to form the layer B, which preferably comprises Si—C and optionally Si—O bonds, makes it possible to benefit from improved thermomechanical properties with respect to the conventional materials of high refractive index, such as $TiO_2$ or $ZrO_2$, in particular, the thermal resistance and the scratch resistance of the substrates coated with the layers B according to the invention are improved, levels hitherto inaccessible with conventional technologies, such as the ion-assisted deposition of purely inorganic layers, being achieved therewith while a high refractive index and a high transparency are maintained.

According to one embodiment of the invention, the layer B comprises more than 80% by weight, preferably more than 90% by weight, of compounds resulting from compound B and metal oxide according to the invention, with respect to the total weight of the layer B. According to one embodiment, the layer B is exclusively formed by vacuum deposition under ion bombardment of at least one metal oxide and of at least one organosilicon compound B, with the exclusion of any other precursor.

Preferably, the layer B contains from 5 to 90% by weight of metal oxides with respect to the weight of the layer B. Also preferably, the layer B contains from 5 to 70% by weight of organosilicon compounds B with respect to the weight of the layer B.

The inorganic precursor compounds of the layer A (generally metal oxides), when they are present, are in a proportion such that the layer A preferably contains less than 30% by weight of inorganic compounds with respect to the weight of the layer A, preferably less than 20%, also preferably less than 10%, and better still less than 5%. According to one preferred embodiment, the layer of organic-inorganic nature (which is preferably a layer A) is not formed from inorganic (mineral) precursor compounds such as mineral oxides and therefore does not contain any inorganic compounds such as metal oxides. The organosilicon compounds are not considered in the present patent application to be inorganic compounds covered by this exclusion. In this case, the layer A is a layer that preferably contains only organosilicon compounds. Preferably, the amount of inorganic compounds or metal oxides in the layer A is smaller than 10% by weight with respect to the weight of the layer A, better still smaller than 5% and even better still smaller than 1%.

Preferably, the layer A contains more than 70% by weight of organosilicon compounds A with respect to the weight of the layer A, better still more than 80%, even better still more than 90% and ideally 100%.

The organic-inorganic layer preferably possesses a thickness ranging from 20 to 500 nm, also preferably from 25 to 250 nm and better still from 30 to 200 nm. In one preferred embodiment, the interference coating contains at least one organic-inorganic layer having a thickness larger than or equal to 250 nm and better still larger than or equal to 300 nm.

In another embodiment, the sum of the thicknesses of the organic-inorganic layers of the interference coating is larger than or equal to 250 nm, better still larger than or equal to 300 nm and even better still larger than or equal to 500 nm.

When it forms the external layer of the interference coating, the organic-inorganic layer preferably has a thickness ranging from 60 to 200 nm. The duration of the deposition process, the flow rates and the pressures are adjusted so as to obtain the desired coating thicknesses.

The nature of the precursor compounds employed, their respective amounts (which can be modulated by adjusting the flow rates evaporated) and the deposition conditions, in particular the duration of the deposition, are examples of parameters that a person skilled in the art will be able to vary in order to obtain an interference coating comprising at least one organic-inorganic layer and having all of the desired properties.

Among its advantageous properties, the article according to the invention possesses an increased resistance to bending and to cracking of the interference coating. This is due to the nature of the organic-inorganic layer of the invention, which possesses a higher elongation at break than that of inorganic layers and may undergo deformations without cracking. The bending resistance of the article according to the invention may be evaluated by means of the bending-resistance test described in patent application WO 2013/098531. The forces applied in this test were representative of the forces applied at an opticians when fitting the glass, i.e. when the glass is "compressed" in order to be inserted into a metal frame. The result of the test was the critical deformation D in mm that the glass can experience before cracks appear. The higher the value of the deformation, the better the resistance to applied mechanical deformation. Generally, interference coatings according to the invention have critical deformation values ranging from 0.5 to 1.9 mm, preferably from 0.5 to 1.4 mm and more preferably from 0.5 to 1 mm.

The critical temperature of a coated article according to the invention is preferably higher than or equal to 60° C., better still higher than or equal to 70° C., even better still higher than or equal to 80° C. and ideally higher than or equal to 90° C. In the present patent application, the critical temperature of an article or a coating is defined as being the temperature starting from which cracks are observed to appear in the stack present at the surface of the substrate, which results in degradation of the coating. This high critical temperature is due to the presence of the organic-inorganic layer at the surface of the article. Moreover, this layer possesses a lower aptitude to take on water than evaporated inorganic layers, and its optical properties have an excellent stability over time.

Because of its improved (with respect to mineral layers) thermomechanical properties, the organic-inorganic layer according to the invention may especially be applied to a single face of a semi-finished lens, generally its front face, the other face of this lens still needing to be machined and treated. The stack present on the front face of the lens will not be degraded by the increase in temperature generated by the treatments to which the back face will be subjected during the curing of the coatings which will have been deposited on this back face or any other action liable to increase the temperature of the lens.

Preferably, the average reflection factor in the visible region (400-700 nm) of an article coated with an interference coating according to the invention, denoted $R_m$, is less than 2.5% per face, better still less than 2% per face and even better still less than 1% per face of the article. In an optimal embodiment, the article comprises a substrate, the two main surfaces of which are coated with an interference coating according to the invention and which exhibits a total $R_m$ value (cumulative reflection due to the two faces) of less than 1%. Means for achieving such $R_m$ values are known to a person skilled in the art.

In the present patent application, the "average reflection factor" $R_m$ (average of the spectral reflection over the entire visible spectrum between 400 and 700 nm) is such as defined in the standard ISO 13666:1998 and is measured according to the standard ISO 8980-4.

In some applications, it is preferable for the main surface of the substrate to be coated with one or more functional coatings prior to the deposition of the interference coating. These functional coatings, which are conventionally used in optics, may, without limitation, be a primer layer for improving the shock-resistance and/or adhesion of subsequent layers in the final product, an anti-abrasion and/or anti-scratch coating, a polarized coating, a photochromic coating, an electrochromic coating or a tinted coating, and may in particular be a primer layer coated with an anti-abrasion and/or anti-scratch coating. The last two coatings are described in more detail in the applications WO 2008/015364 and WO 2010/109154.

The article according to the invention may also comprise coatings, formed on the interference coating, capable of modifying the surface properties of the interference coating, such as a hydrophobic coating and/or oleophobic coating (anti-smudge top coat) or an anti-fogging coating. These coatings are preferably deposited on the external layer of the interference coating. They are generally less than or equal to 10 nm in thickness, preferably from 1 to 10 nm in thickness and better still from 1 to 5 nm in thickness. They are described in the applications WO 2009/047426 and WO 2011/080472 respectively.

Typically, an article according to the invention comprises a substrate successively coated with a layer of adhesion and/or impact-resistant primer, with an abrasion-resistant and/or scratch-resistant coating, with the multilayer interference coating comprising at least one organic-inorganic layer, and with a hydrophobic and/or oleophobic coating.

The invention also relates to a process for manufacturing an article such as defined above, comprising at least the following steps:

supplying an article comprising a substrate having at least one main surface, depositing on said main surface of the substrate a multilayer interference coating comprising at least one layer having a refractive index higher than 1.65 and at least one layer having a refractive index lower than or equal to 1.65, at least one of the layers of the interference coating being a layer of organic-inorganic nature that was deposited under vacuum and that has a thickness larger than or equal to 30 nm, said interference coating having a thickness larger than or equal to 450 nm and/or a number of layers higher than or equal to 8.

collecting an article comprising a substrate having a main surface coated with said interference coating.

DETAILED DESCRIPTION

The invention is illustrated in a nonlimiting way by the following examples.

Examples

1. General Procedures

The articles employed in the examples comprise an Orma® Essilor lens substrate with a diameter of 65 mm, with a power of −2.00 diopters and with a center thickness of 1.2 mm, coated on its concave face with the impact-resistant primer coating and with the scratch-resistant and abrasion-resistant coating (hard coat), which are disclosed in the experimental section of the application WO 2010/109154, and an antireflection interference coating comprising a layer A according to the invention.

The vacuum deposition reactor is a Leybold LAB1100+ device equipped with an electron gun for the evaporation of the precursor materials, with a thermal evaporator, with a KRI EH 1000 F ion gun (from Kaufman & Robinson Inc.), for the preliminary phase of preparation of the surface of the substrate by argon ions (IPC) and also for the deposition of the layers under ion bombardment (IAD), and with a system for the introduction of liquid, which system is used when the organosilicon precursor compound in particular of the layer A is a liquid under standard temperature and pressure conditions (case of decamethyltetrasiloxane). This system comprises a tank containing the liquid precursor compound of the layer in question, resistance heaters for heating the tank, tubes connecting the tank of liquid precursor to the vacuum deposition device and a vapor flowmeter from MKS (MKS1150C), brought to a temperature of 30-120° C. during its use, depending on the flow rate of vaporized decamethyltetrasiloxane, which preferably varies from 0.01 to 0.8 g/min (1 to 50 sccm) (the temperature is 120° C. for a flow rate of 0.3 g/min (20 sccm) of decamethyltetrasiloxane).

The decamethyltetrasiloxane vapor exits from a copper tube inside the machine, at a distance of about 30 cm from the ion gun. Flows of oxygen and optionally of argon are introduced into the ion gun. Preferably, neither argon nor any other rare gas is introduced into the ion gun.

The layers A according to the invention are formed by vacuum evaporation assisted by a beam of oxygen and optionally argon ions during the deposition (evaporation source: electron gun) of decamethyltetrasiloxane, supplied by Sigma-Aldrich.

Unless otherwise indicated, the thicknesses mentioned in the present patent application are physical thicknesses. Several samples of each glass were prepared.

2. Procedures

The process for the preparation of the optical articles according to the invention comprises the introduction of the substrate, coated with the primer coating and with the abrasion-resistant coating which are defined above, into the vacuum deposition chamber; the preheating of the tank, the pipes and the vapor flowmeter to the chosen temperature (~15 min), a primary pumping stage, then a secondary pumping stage for 400 seconds making it possible to obtain a high vacuum (~2×10$^{-5}$ mbar, pressure read from a Bayard-Alpert gauge); a stage of activation of the surface of the substrate by a beam of argon ions (IPC: 1 minute, 100 V, 1 A, the ion gun remaining in operation at the end of this step), then the deposition by evaporation of an antireflection coating comprising at least one layer A.

Deposition of a layer A according to the invention: The ion gun having been started with argon, oxygen is added to the ion gun with a programmed flow rate, the desired anode current (3 A) is programmed and the argon flow is optionally halted, depending on the deposition conditions desired. Generally, the process according to the invention is carried out with oxygen (flow rate of $O_2$ in the ion gun level with the ion source: 20 sccm), in the absence of rare gas (no argon flow level with the ion source). The decamethyltetrasiloxane is introduced into the deposition chamber in gaseous form (injection flow rate: 20 sccm). The supply of this compound is stopped once the desired thickness has been obtained, then the ion gun is turned off.

The other metal-oxide layers (containing no organosilicon compound) were deposited conventionally by vacuum evaporation of the right metal oxide (zirconium oxide, $SiO_2$ etc.), without ion assistance.

The thickness of the layers deposited was controlled in real-time by means of a quartz microbalance, the rate of deposition being modified, if need be, by adjusting the current of the electron gun. Once the desired thickness is obtained, the shutter or shutters were closed, the ion and electron gun or guns were switched off and the gas flows (oxygen, optionally argon and decamethyltetrasiloxane vapors) were halted.

A final venting step was carried out once the deposition of the stack had finished.

A plurality of comparative examples were prepared, the one or more layers A according to the invention being replaced with layers of $SiO_2$. Thus, the stack of comparative example 1 differs from the stack of examples 1 to 3 in that the organosilicon compounds have been removed from the layers of the antireflection coating and replaced with silica, and the stack of comparative example 4 differs from the stack of the example 4 in that the organosilicon compounds have been removed from the layers of the antireflection coating and replaced with silica.

The articles of examples 1-4 and of the comparative examples are selective optical filters for filtering blue light. The interference coating used in examples 1-3 and comparative example 1 is a stack of large thickness (1210.5 nm) comprising 5 layers having a large thickness (>100 nm). The interference coating used in example 4 and comparative example 4 is a stack of smaller thickness (510 nm) comprising a high number of layers (8).

3. Characterizations

The critical temperature of the article is measured 24 hours and/or one week after its preparation, in the way indicated in the application WO 2008/001011.

Unless otherwise indicated, the refractive indices to which reference is made in the present invention are expressed for a wavelength of 632.8 nm and were measured by ellipsometer at a temperature of 20-25° C.

The bending resistance test, described in patent application WO 2013/098531, allows the capacity of an article having a curvature to undergo a mechanical deformation to be evaluated. The result of the test, which was carried out one month after production of the eyeglasses, is the critical deformation D in mm that the eyeglass can undergo before cracks appear. The higher the value of the deformation, the better the resistance to applied mechanical deformation.

The adhesion properties of the whole of the interference coating to the substrate were verified on the convex face of the lens by means of the test commonly referred to in French as the "n×10 coups" test (i.e. the "n×10 rubs" test) following the procedure described in international patent applications WO 2010/109154 and WO 99/49097 (N.B. in the latter this test is referred to as the "n 10 blow" test), using a number of cycles equal to 13. The test consists in noting the number of cycles that the lens was able to be subjected to before the appearance of a defect. Therefore, the higher the value obtained in the n×10 rubs test, the better the adhesion of the interference coating to the substrate.

The abrasion resistance of the article was evaluated by determining Bayer ASTM (Bayer sand) values for substrates coated with the antireflection coating, using the methods described in patent application WO 2008/001011 (standard ASTM F 735.81). The higher the value obtained in the Bayer test, the higher the resistance to abrasion. Thus, the Bayer ASTM (Bayer sand) value was deemed to be good when it was higher than or equal to 3.4 and lower than 4.5 and excellent for values of 4.5 or more.

Hardness, or scratch resistance, was evaluated by virtue of the test referred to in French as the "paille de fer (pdf manuel, ou test à la laine d'acier)" test i.e. the "manual steel wool" test, such as described in patent application WO 2008/062142. The higher the score obtained (score ranging from 1 to 5), the lower the scratch resistance of the eyeglass.

4. Results

The tables below collate the optical and mechanical performance of comparative articles or various articles according to the invention and the deposition conditions of the various layers.

Example 1
Substrate + primer + hard coat

| | |
|---|---|
| $ZrO_2$ | 13.5 nm |
| Layer A * | 404 nm |
| $SiO_2$ | 8 nm |
| $ZrO_2$ | 153 nm |
| $SiO_2$ | 235 nm |
| $ZrO_2$ | 277 nm |
| $SiO_2$ | 120 nm |

Comparative example C1
Substrate + primer + hard coat

| | |
|---|---|
| $ZrO_2$ | 13.5 nm |
| $SiO_2$ | 412 nm |
| $ZrO_2$ | 153 nm |
| $SiO_2$ | 235 nm |
| $ZrO_2$ | 277 nm |
| $SiO_2$ | 120 nm |

Example 3
Substrate + primer + hard coat

| | |
|---|---|
| $ZrO_2$ | 13.5 nm |
| Layer A * | 404 nm |
| $SiO_2$ | 8 nm |
| $ZrO_2$ | 153 nm |
| $SiO_2$ | 235 nm |
| $ZrO_2$ | 277 nm |
| Layer A * | 120 nm |

Example 2
Substrate + primer + hard coat

| | |
|---|---|
| $ZrO_2$ | 13.5 nm |
| $SiO_2$ | 412 nm |
| $ZrO_2$ | 153 nm |
| $SiO_2$ | 235 nm |
| $ZrO_2$ | 277 nm |
| Layer A * | 120 nm |

Example 4
Substrate + primer + hard coat

| | |
|---|---|
| $ZrO_2$ | 47 |
| $SiO_2$ | 50 |
| $ZrO_2$ | 54 |
| $SiO_2$ | 69 |
| $ZrO_2$ | 44 |
| $SiO_2$ | 61 |
| $ZrO_2$ | 53 |
| Layer A * | 132 |

Comparative example C4
Substrate + primer + hard coat

| | |
|---|---|
| $ZrO_2$ | 47 |
| $SiO_2$ | 50 |
| $ZrO_2$ | 54 |
| $SiO_2$ | 69 |
| $ZrO_2$ | 44 |
| $SiO_2$ | 61 |
| $ZrO_2$ | 53 |
| $SiO_2$ | 132 |

Layer A: Decamethyltetrasiloxane.
* Deposition under ion assistance.

| Example | Bayer ASTM test | n × 10 rubs test | Steel wool test | Critical T [° C.] at t + 24 h | Critical T [° C.] at t + 1 week | Resistance to bending, deformation in mm before cracking |
|---|---|---|---|---|---|---|
| 1 | 6.8 | 13 | 3 | 60 | 60 | 0.66 |
| C1 | 6.8 | 13 | 3 | 60 | 50 | 0.32 |
| 2 | 10.0 | 13 | 3 | 70 | 70 | 0.36 |
| 3 | 9.0 | 13 | 1-3 | 70 | 60 | 0.63 |

-continued

| Example | Bayer ASTM test | n × 10 rubs test | Steel wool test | Critical T [° C.] at t + 24 h | Critical T [° C.] at t + 1 week | Resistance to bending, deformation in mm before cracking |
|---|---|---|---|---|---|---|
| 4 | 3.2-5.5 | 13 | 3 | 70-80 | 50-70 | 0.65 |
| C4 | 1.6 | 13 | 3 | 70 | 50 | 0.44 |

The articles of examples 1 to 4 exhibit no cracking at the end of their production and performed well in the various durability tests carried out. They have critical temperatures higher by 10 to 20° C. and bending resistances 1.5 to 2 times higher than the articles of the comparative examples the antireflection layers of which contain no organosilicon compound.

The best compromise in the performance level with respect to resistance to bending and abrasion and critical temperature was obtained with example 3.

The resistance to abrasion of the articles of examples 2 and 3 is remarkably high.

The invention claimed is:

1. An article comprising a substrate having at least one main surface coated with a multilayer interference coating comprising at least one layer having a refractive index higher than 1.65 and at least one layer having a refractive index lower than or equal to 1.65 comprising $SiO_2$, at least one of the layers of the multilayer interference coating being an organic-inorganic layer obtained by deposition under vacuum of at least one organosilicon compound and that has a physical thickness larger than or equal to 250 nm, said multilayer interference coating having a number of layers higher than or equal to 9; wherein said organic-inorganic layer does not comprise any metal oxide; wherein the article comprises the following components stacked in the following order: said substrate, a first layer having a refractive index higher than 1.65 comprising $ZrO_2$, said organic-inorganic layer, in direct contact with a layer comprising a silicon oxide and having a physical thickness less than or equal to 15 nm, in direct contact with a second layer having a refractive index higher than 1.65 containing at least one metal oxide, wherein the organosilicon compound is chosen from octamethylcyclotetrasiloxane, 2,4,6,8-tetramethylcyclotetrasiloxane, decamethyltetrasiloxane, decamethylcyclopentasiloxane, dodecamethylpentasiloxane, and hexamethyldisiloxane, and wherein the substrate is an organic substrate.

2. The article as claimed in claim 1, wherein the organic-inorganic layer comprises atoms of carbon, of oxygen and of a metal or metalloid.

3. The article as claimed in claim 1, wherein the organic-inorganic layer is deposited under the assistance of a source of ions.

4. The article as claimed in claim 1, wherein the organic-inorganic layer is a layer A having has a refractive index lower than or equal to 1.65.

5. The article as claimed in claim 1, wherein said organic-inorganic layer does not comprise any purely inorganic compound.

6. The article as claimed in claim 1, wherein the multilayer interference coating has a physical thickness larger than or equal to 450 nm.

7. The article as claimed in claim 1, wherein the multilayer interference coating has a physical thickness larger than 1 µm.

8. The article as claimed in claim 1, wherein said organic-inorganic layer has a physical thickness larger than or equal to 300 nm.

9. The article as claimed in claim 1, wherein the multilayer interference coating comprises a second organic-inorganic layer.

10. The article as claimed in claim 1, wherein the multilayer interference coating is a selective optical filter and/or an antireflection coating.

11. The article as claimed in claim 1, wherein the organic-inorganic layer is deposited under ion bombardment achieved by means of an ion gun.

12. The article as claimed in claim 1, wherein the multilayer interference coating is a selective optical filter that at least partially blocks blue light having a wavelength ranging from 400 to 500 nm.

13. The article as claimed in claim 1, wherein said organic-inorganic layer contains more than 90% by weight of organosilicon compounds with respect to the weight of the layer.

14. The article as claimed in claim 1, wherein said organic-inorganic layer contains 100% by weight of organosilicon compounds with respect to the weight of the layer.

15. The article as claimed in claim 1, wherein the multilayer interference coating comprises at least one purely inorganic layer.

16. The article as claimed in claim 1, wherein said organic-inorganic layer contains more than 80% by weight of organosilicon compounds with respect to the weight of the layer.

17. The article as claimed in claim 1, wherein the multilayer interference coating has a number of layers higher than or equal to 10.

18. The article as claimed in claim 1, wherein said second layer having a refractive index higher than 1.65 comprises $ZrO_2$.

19. The article as claimed in claim 18, wherein the organosilicon compound is decamethyltetrasiloxane.

* * * * *

UNITED STATES PATENT AND TRADEMARK OFFICE
CERTIFICATE OF CORRECTION

| | | |
|---|---|---|
| PATENT NO. | : 11,707,921 B2 | Page 1 of 1 |
| APPLICATION NO. | : 16/923439 | |
| DATED | : July 25, 2023 | |
| INVENTOR(S) | : Sébastien Chiarotto et al. | |

It is certified that error appears in the above-identified patent and that said Letters Patent is hereby corrected as shown below:

In the Claims

In Claim 4, Column 21, Line 56, please delete "is a layer A having" --therefore.

Signed and Sealed this
Twenty-sixth Day of September, 2023

Katherine Kelly Vidal
*Director of the United States Patent and Trademark Office*